United States Patent [19]

Hirsch

[11] 4,206,464

[45] Jun. 3, 1980

[54] ARRANGEMENT INCLUDING CIRCULATORS FOR CONNECTING A PLURALITY OF TRANSMITTERS AND RECEIVERS TO A COMMON ANTENNA

[75] Inventor: Gerhard Hirsch, Backnang, Fed. Rep. of Germany

[73] Assignee: Licentia Patent-Verwaltungs-GmbH, Frankfurt am Main, Fed. Rep. of Germany

[21] Appl. No.: 833,705

[22] Filed: Sep. 15, 1977

[30] Foreign Application Priority Data

Sep. 17, 1976 [DE] Fed. Rep. of Germany ....... 2641875
Sep. 17, 1976 [DE] Fed. Rep. of Germany ... 7629080[U]

[51] Int. Cl.[2] ............ H04B 1/52

[52] U.S. Cl. ............ 371/58; 333/1.1; 455/82

[58] Field of Search ............ 343/176, 178; 325/321; 333/1.1, 11, 117

[56] References Cited

U.S. PATENT DOCUMENTS

| | | | |
|---|---|---|---|
| 2,832,054 | 4/1958 | Fox | 333/11 |
| 3,032,723 | 5/1962 | Ring | 333/1.1 |
| 3,309,698 | 3/1967 | Baldock | 325/21 |
| 3,636,452 | 1/1972 | Nuding | 333/1.1 |
| 3,648,197 | 3/1972 | Siekanowicz | 333/1.1 |

FOREIGN PATENT DOCUMENTS

| | | |
|---|---|---|
| 276809 | 3/1965 | Australia . |
| 1196254 | 3/1966 | Fed. Rep. of Germany . |

*Primary Examiner*—John C. Martin
*Assistant Examiner*—Joseph A. Orsino, Jr.
*Attorney, Agent, or Firm*—Spencer & Kaye

[57] ABSTRACT

A microwave combining filter arrangement including circulators for connecting a plurality of transmitters and receivers to a common antenna wherein the circulators are all three-arm circulators which are connected in cascade and the transmitters and the receivers are alternatingly connected to the circulator chain.

9 Claims, 4 Drawing Figures

ARRANGEMENT INCLUDING CIRCULATORS FOR CONNECTING A PLURALITY OF TRANSMITTERS AND RECEIVERS TO A COMMON ANTENNA

BACKGROUND OF THE INVENTION

The present invention relates to an arrangement including circulators for connecting a plurality of microwave transmitters and receivers to a common antenna.

It is well known in the art to connect a plurality of directional radios (transmitters and receivers) to an associated antenna via appropriate antenna combining filters which effect decoupling of the radio devices from one another. The most important components of such antenna combining filters are frequency filters which are tuned to the operating channel of the associated respective instrument or radio devices, and circulators which serve to produce the interconnection of the radio devices (see, for example, U.S. Pat. No. 3,530,471, issued Sept. 22, 1970).

In the conventional system combining filter arrangements (see, for example, German Pat. No. 1,196,254 issued Mar. 10, 1966) the individual transmitters are connected together via a first series connection of circulators and the individual receivers are connected together via a second series connection of circulators. A further circulator, the so-called combining circulator, is provided to connect these two series connections of circulators to a common antenna.

SUMMARY OF THE INVENTION

It is the object of the present invention to provide a circuit arrangement for connecting a plurality of transmitters and receivers to a common antenna which, inter alia, eliminates the additional so-called combining circulator.

The above object is achieved in that based on a microwave combining filter arrangement including circulators for connecting a plurality of transmitters and receivers to a common antenna, the circulators are provided in the form of three-arm circulators which are connected in cascade and the transmitters and receivers are alternatingly connected to the circulator chain.

DETAILED DESCRIPTION OF THE PREFERRED EMBODIMENTS

Figure 1:
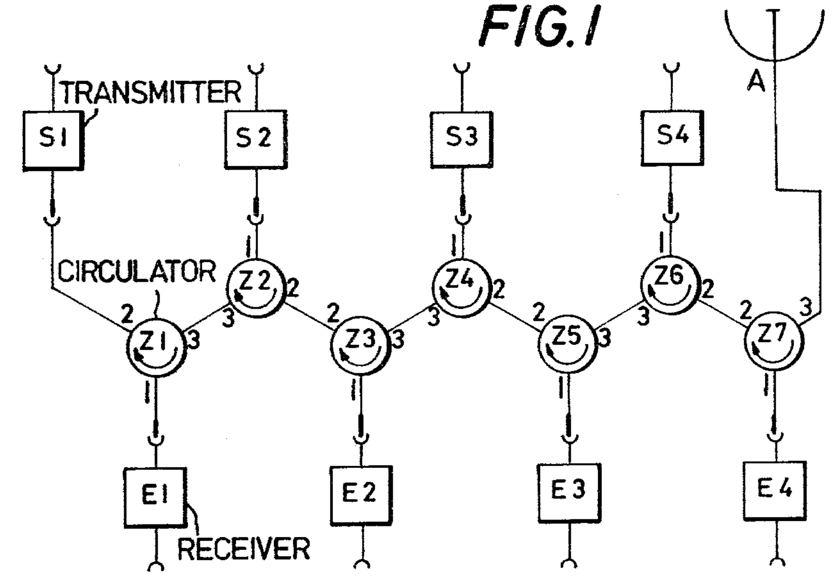
FIG. 1 is a block diagram of one embodiment of the invention wherein the transmitters and receivers are individually alternately connected to the circulator chain.

Referring now to FIG. 1 there is shown an embodiment of the invention in which four transmitters S1, S2, S3, S4 and four receivers E1, E2, E3, E4 are connected to a common microwave antenna A. For this purpose, the transmitters and the receivers are alternatingly connected to a circular chain including circulators Z1, Z2, Z3, Z4, Z5, Z6 and Z7 which are connected in cascade. Each of the circulators, whose direction of circulation is indicated by an arrow, is formed by a three-arm or three-port circulator. The first circulator Z1, for example, is connected at its arm 1 with receiver E1 and at its arm 2 with transmitter S1. The arm 3 of circulator Z1 is connected to the next circulator Z2 of the circulator chain, and in particular to its arm 3. The circulator Z2 has its arm 1 connected to the transmitter S2 and its arm 2 connected to the arm 2 of the circulator Z3. In a similar manner, the other directional radio devices (transmitters and receivers) are connected to the thus formed circulator chain. In particular as shown, each of the transmitters S1–S4 is connected to an arm of its associated circulator so that, in the direction of circulation, the next succeeding arm of its associated circulator, e.g. arm 2 of circulator Z2, will be an arm which is connected to an arm of the succeeding circulator of the chain in a direction toward the antenna, e.g., arm 2 of circulator Z3, while each receiver E1–E4 is connected to an arm of its associated circulator so that, in the direction of circulation, the immediately preceding arm of its associated circulator, e.g. arm 3 of circulator Z3, will be an arm which is connected to an arm of the preceding circulator of the chain in a direction from the antenna, e.g., arm 3 of circulator Z4. It is further to be understood that although not shown, as is conventional, each of the radio instruments, i.e., transmitters S1–S4 and receivers E1–E4, is connected to the respective arm of the associated circulator via a respective filter which is tuned to the operating channel of the associated instrument.

Figure 2:
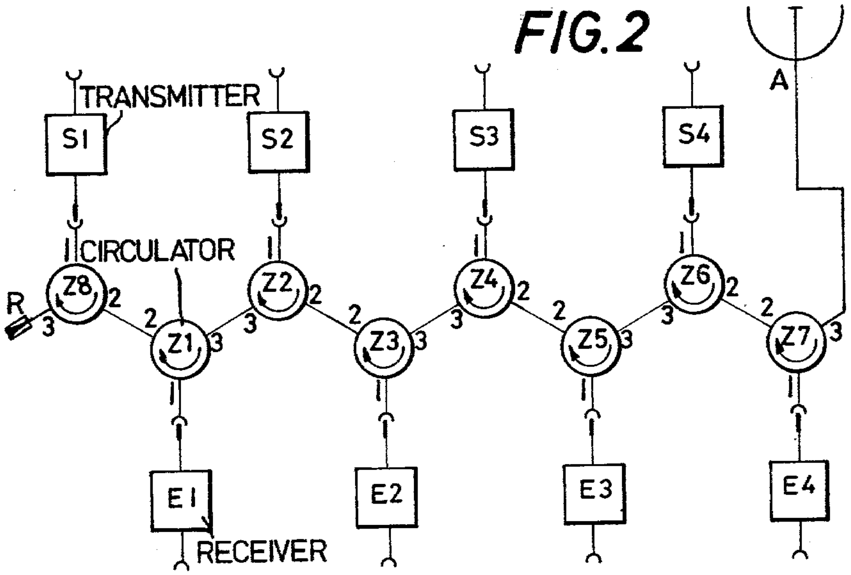
FIG. 2 is a block diagram showing a modification of the embodiment of FIG. 1.

FIG. 2 shows a modification of the embodiment of FIG. 1 of the present invention. Here again three-arm circulators Z1, Z2, Z3, Z4, Z5, Z6, Z7, are employed to connect the required transmitters and receivers to the common microwave antenna A2. In deviation from the embodiment shown in FIG. 1, the device most remote from the antenna A, i.e., the transmitter S1, in the illustrated embodiment, is not connected directly to arm 2 of circulator Z1 but through the intermediary of a further likewise three-armed circulator Z8. In particular, the microwave transmitter S1 is connected to arm 1 of circulator Z8 whose arm 2 is connected to the arm 2 of circulator Z1 and thus forms a portion of the circulator chain. The remaining arm 3 of the circulator Z8 is connected to a broadband terminating resistor R. Such a configuration will be selected instead of the configuration of FIG. 1 for very broadbanded multichannel devices, or where longer energy lines to the antenna A are required. The other transmitters S2–S4 and receivers E1–E4 of FIG. 2 are connected to the antenna A via their associated circulators in a manner corresponding to the arrangement described in connection with FIG. 1.

Figure 3:
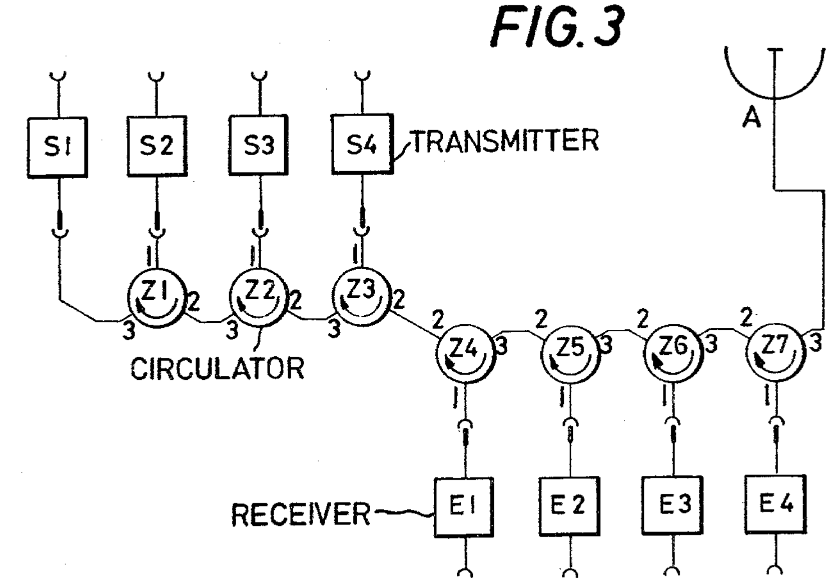
FIG. 3 is a block diagram of another embodiment of the invention wherein the transmitters and receivers are alternately connected to the circulator chain in groups.

According to a further embodiment of the invention, as it is shown in FIG. 3, a plurality of transmitters and/or receivers can be connected to the circulator chain while combined into groups. The circulator chain according to FIG. 3 includes the individual three-arm circulators Z1, Z2, Z3, Z4, Z5, Z6, Z7, which are conected in cascade, and has one end, i.e., the arm 3 of circulator Z7, connected to the common microwave antenna A. In the illustrated embodiment, the four transmitters S1, S2, S3, S4 and the four receivers E1, E2, E3, E4, were each combined into a respective group with the group of transmitters being connected to the circulators Z1–Z3 and the group of receivers being connected to the circulators Z4–Z7 of the chain. Thus the group of transmitters and the group of receivers are connected to the circulator chain in an alternating sequence.

Figure 4:
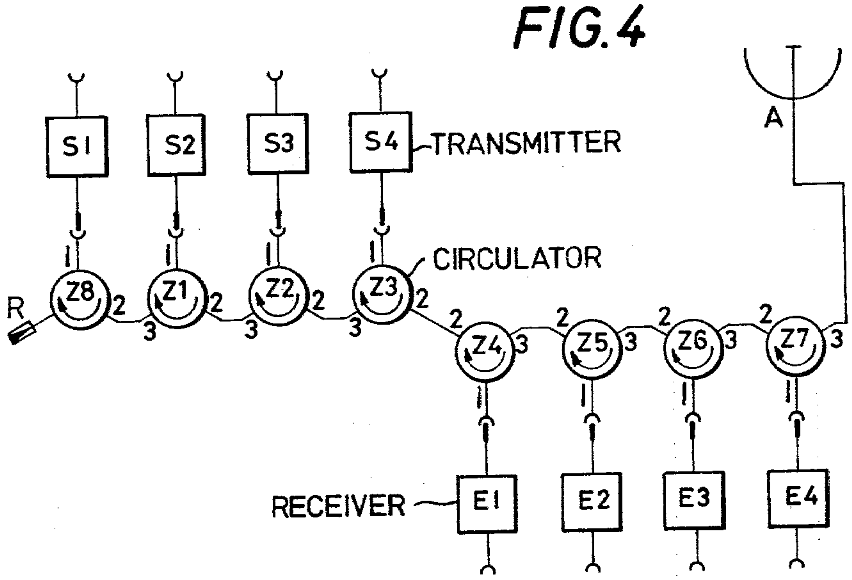
FIG. 4 is a block diagram showing a modification of the embodiment of FIG. 3.

For particularly broadbanded multichannel devices or for long energy lines, it is possible to connect the device most remote from the antenna, i.e., the transmitter S1 in the illustrated embodiment, to the circulator chain, again through the intermediary of an additional three-arm circulator Z8, as shown in FIG. 4. In this case, the remaining arm 3 of this circulator Z8 is simultaneously provided with a broadbanded terminating resistor R. Transmitter S1 itself is connected to arm 1 of circulator Z8 while arm 3 leads to the next circulator Z1 of the circulator chain, i.e., to its arm 3. At the end of the chain, the microwave antenna A is connected to arm 3 of circulator Z7.

The combining filter arrangement according to the invention with its cascade connection permits the use of three-arm circulators and eliminates the combining circulator mentioned in the introduction above which is required in prior art arrangements. It is of advantage for the manufacture of the circulators that all circulators, i.e., circulators Z1–Z8, regardless of whether they are to be connected to transmitters or receivers, can have the same design and the same dimensions. In U.S. Pat. Nos. 3,359,510, issued Dec. 19, 1967 and 3,277,399, issued Oct. 4, 1966, circulators are described which can be used for the arrangement of the present invention.

For certain design concepts prescribed by a user the embodiment shown in FIGS. 1 and 2 is of advantage because in this arrangement a transmitter, a receiver and, if required, a common current supply member for both can be combined mechanically to form a structural unit. The realization of the invention shown in FIGS. 3 and 4 is of advantage in systems in which, for reasons possibly required by the particular system involved, all transmitters or all receivers, respectively, can be combined into one structural group. The cascade connection of the circulators has the additional advantage that this chain can be expanded very easily at will without requiring complicated waveguide trains which would increase the dimensions of the associated devices.

It will be understood that the above description of the present invention is susceptible to various modifications, changes and adaptations, and the same are intended to be comprehended within the meaning and range of equivalents of the appended claims.

What is claimed is:

1. In a microwave combining filter arrangement including a plurality of circulators for connecting a plurality of transmitters and receivers to a common antenna; the improvement wherein: all of said circulators are three-arm circulators; all of said circulators are connected in cascade to form a single circulator chain with the direction of rotation of each of said circulators being the same; one end of said circulator chain is connected to said antenna; and said transmitters and said receivers are alternatingly connected to the circulators of said circulator chain.

2. An arrangement as defined in claim 1 wherein each of said circulators has one arm connected to a respective different one of said transmitters and receivers and wherein the one of said transmitters and receivers which is most remote from said antenna is connected to the arm of said chain which would normally constitute the other end of said chain, so that one of said transmitters and one of said receivers are connected to respective arms of the one of said circulators which is most remote from said antenna.

3. An arrangement as defined in claim 1 wherein each of said transmitters and receivers is connected to one arm of a respective different one of said circulators and wherein the third arm of the one of said circulators which is most remote from said antenna, and which would normally constitute the other end of said circulator chain, is connected to a broadbanded terminating resistor.

4. An arrangement as defined in claim 1 wherein the transmitters and receivers are each combined into respective groups, and said groups are alternatingly connected to the circulators of said chain with each of said transmitters and receivers other than the one of said transmitters and receivers most remote from said antenna being connected to one arm of a respective different one of said circulators and with said one of said transmitters and receivers which is most remote from said antenna being connected to the arm of said chain which would normally constitute the other end of said chain so that two similar of said plurality of transmitters and receivers are connected to the one of said circulators which is most remote from said antenna.

5. An arrangement as defined in claim 4 wherein two transmitters are connected to respective arms of said one of said circulators which is most remote from said antenna.

6. An arrangement as defined in claim 1 wherein the transmitters and receivers are each combined into respective groups, and said groups are alternatingly connected to the circulators of said chain with each of said transmitters and receivers being connected to one arm of a respective one of said circulators; and wherein the third arm of the one of said circulators which is most remote from said antenna, and which would normally constitute the other end of said circulator chain, is connected to a broadbanded terminating resistor.

7. An arrangement as defined in claim 1 wherein each of said transmitters and receivers is connected to one arm of a respective one of said circulators with each of said transmitters being connected to an arm of its associated circulator so that, in the direction of circulation, the next succeeding arm of the associated circulator, will be an arm which is connected to the succeeding circulator of said chain in a direction toward the antenna, and with each of said receivers being connected to an arm of its associated circulator so that, in the direction of circulation, the immediately preceding arm of the associated circulator will be an arm which is connected to the preceding circulator of said chain in a direction from said antenna.

8. An arrangement as defined in claim 1 wherein: each of said plurality of circulators other than the first and last circulator of said chain has first and second arms connected to one arm of the adjacent preceding and succeeding circulator respectively of said chain and a third arm connected to a respective one of said plurality of transmitters and receivers; said first circulator has one of its arms connected to an arm of the adjacent circulator of said chain, a second of its arms connected to said antenna and its third arm connected to a respective one of said plurality of transmitters and receivers; and said last circulator has one of its arms connected to an arm of the adjacent circulator of said chain, a second of its arms connected to a respective one of said plurality of transmitters and receivers, and its third arm connected to a broadband terminating resistor.

9. An arrangement as defined in claim 1 wherein: each of said plurality of circulators other than the first and last circulator of said chain has first and second arms connected to one arm of the adjacent preceding and succeeding circulator respectively of said chain and a third arm connected to a respective one of said plurality of transmitters and receivers; said first circulator has one of its arms connected to an arm of the adjacent circulator of said chain, a second of its arms connected to said antenna and its third arm connected to a respective one of said plurality of transmitters and receivers; and said last circulator has one of its arms connected to an arm of the adjacent circulator of said chain, and second and third arms connected to respective ones of said plurality of transmitters and receivers.

* * * * *